(12) United States Patent
Gregory et al.

(10) Patent No.: US 7,802,898 B1
(45) Date of Patent: *Sep. 28, 2010

(54) LIGHTNING DEVICE

(75) Inventors: Thomas M. Gregory, Belgrade, MT (US); Robert A. Kincaid, Bozeman, MT (US); Craig Adam Lamb, Bozeman, MT (US); Birten L. Todd, Harrison, MT (US); Eric M. Yeates, Virginia Beach, VA (US); Clifton L. Cook, Boise, ID (US); Thomas A. Marx, Virginia Beach, VA (US); John E. Proc, Manhattan, MT (US)

(73) Assignee: Blackhawk Industries Product Group Unlimited LLC, Norfolk, VA (US)

( * ) Notice: Subject to any disclaimer, the term of this patent is extended or adjusted under 35 U.S.C. 154(b) by 167 days.

This patent is subject to a terminal disclaimer.

(21) Appl. No.: 11/900,157

(22) Filed: Sep. 10, 2007
(Under 37 CFR 1.47)

Related U.S. Application Data

(63) Continuation-in-part of application No. 11/254,159, filed on Oct. 19, 2005, now Pat. No. 7,281,815.

(60) Provisional application No. 60/620,020, filed on Oct. 19, 2004.

(51) Int. Cl.
*F21L 4/04* (2006.01)
(52) U.S. Cl. ...................... 362/205; 362/394
(58) Field of Classification Search ................. 362/158, 362/183, 194, 205, 206, 208, 209, 276, 394, 362/802
See application file for complete search history.

(56) References Cited

U.S. PATENT DOCUMENTS

| 4,152,755 | A * | 5/1979 | Trosper et al. ............. 362/158 |
| 7,220,016 | B2 * | 5/2007 | Matthews et al. ........... 362/205 |
| 7,344,270 | B2 * | 3/2008 | Kim ........................... 362/205 |
| 2005/0122714 | A1 * | 6/2005 | Matthews et al. ........... 362/206 |

* cited by examiner

*Primary Examiner*—Hargobind S Sawhney
(74) *Attorney, Agent, or Firm*—Bowman Green Hampton & Kelly, PLLC

(57) ABSTRACT

A switch assembly that is utilized as a tail cap of a lighting device. The switch assembly comprises a depressible switch that allows the user to activate the lighting device. In an illustrative, non-limiting embodiment, the switch assembly has four channels, providing for at least three different light functions and a locking channel. In these non-limiting embodiments, the different channels are defined by the axial position of the rotatable portion relative to the lighting device body.

33 Claims, 6 Drawing Sheets

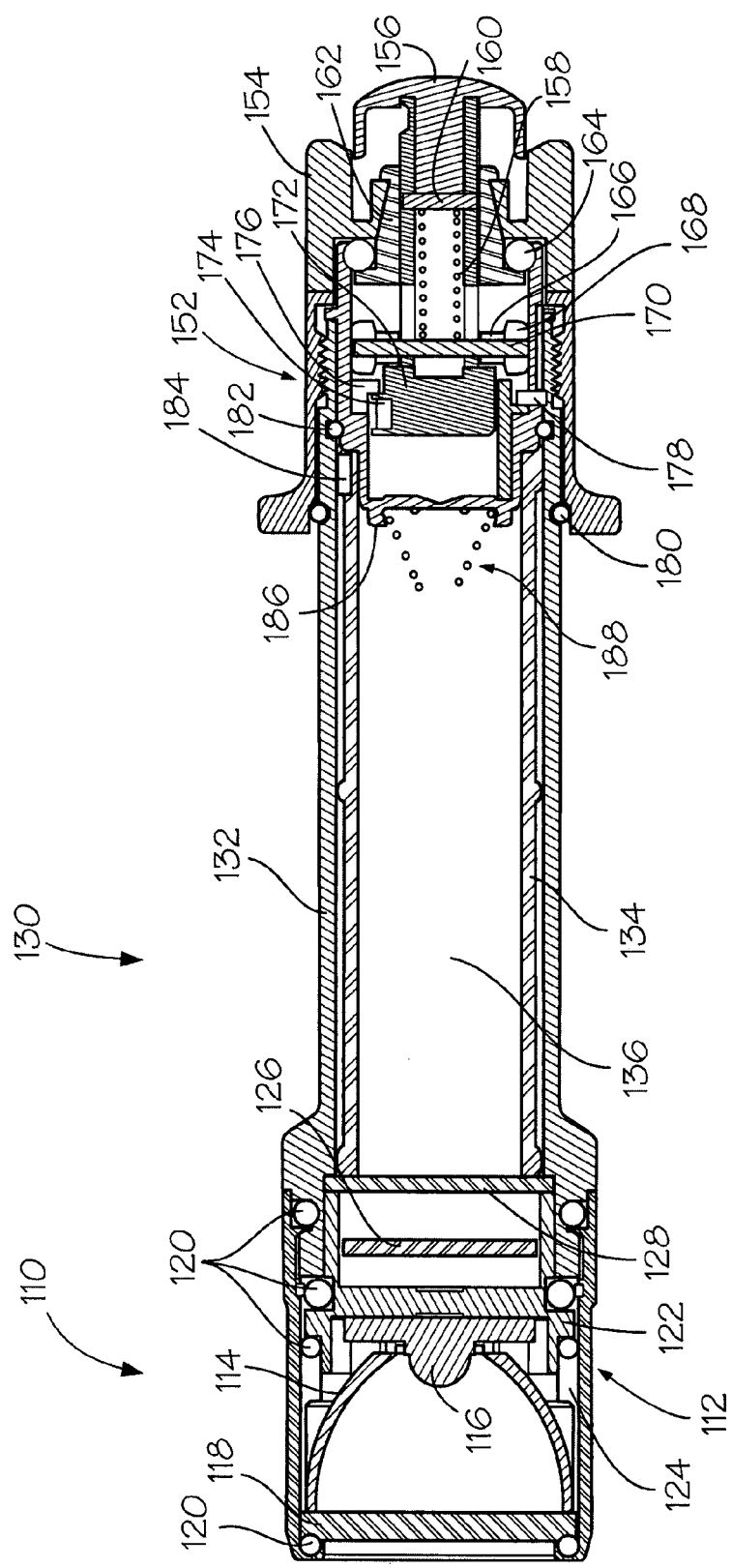

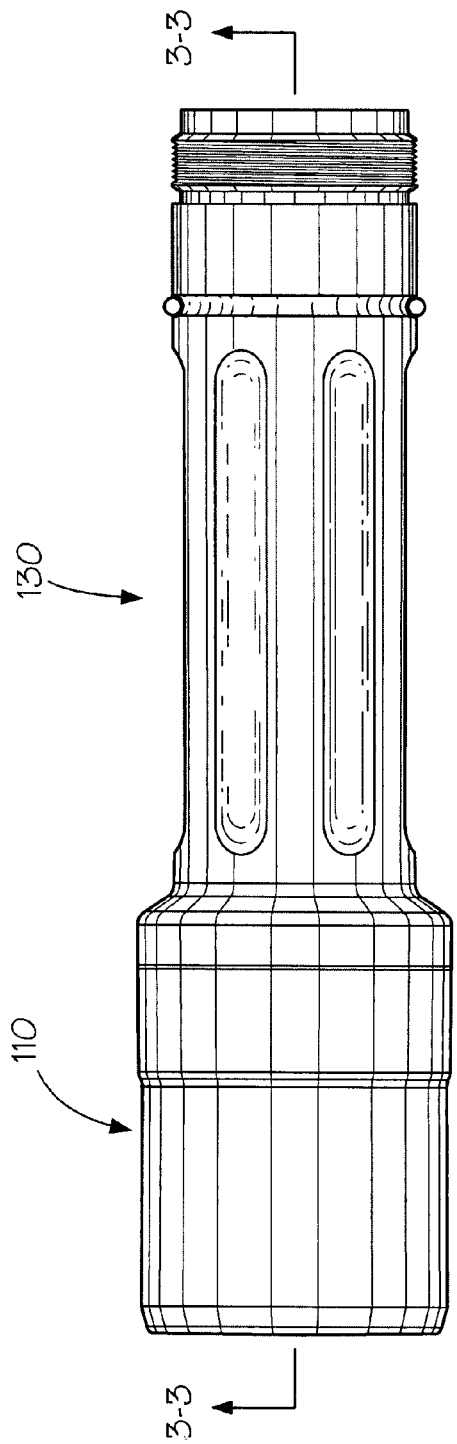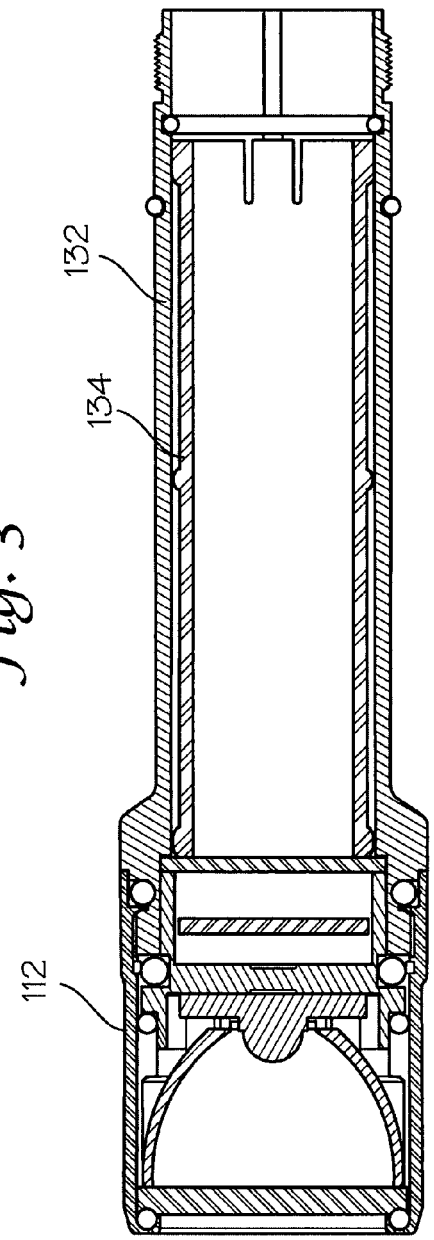

LIGHTNING DEVICE

CROSS-REFERENCE TO RELATED APPLICATIONS

This is a Continuation-In-Part of U.S. patent application Ser. No. 11/254,159, filed Oct. 19, 2005 now U.S. Pat. No. 7,281,815, which claims the benefit of U.S. Provisional Patent Application Ser. No. 60/620,020, filed Oct. 19, 2004, the entire disclosures of which are incorporated herein by reference.

BACKGROUND OF THE INVENTION

Field of the Invention

This invention relates generally to a lighting device, such as, for example, a flashlight.

SUMMARY OF THE INVENTION

This invention relates generally to a lighting device, such as, for example, a flashlight having a single- or a multi-position switch.

In an illustrative, non-limiting embodiment of this invention, the lighting device includes a multi-position switch assembly, which comprises a switch assembly that is utilized as a tail cap of a flashlight. In various, non-limiting embodiments, a first portion of the switch assembly unscrews from the flashlight body so that a user may, for example, replace the batteries in the flashlight. A second portion of the switch assembly comprises a depressible switch with a rotatable portion, or rotator, to allow the user to activate distinct functional modes of the flashlight.

In an illustrative, non-limiting embodiment of this invention, the various functional modes of the flashlight may be implemented as the output of, for example, a high current MOSFET acting as a microprocessor controlled switch, or controller. The various output patterns and on/off functions of the flashlight light source are driven by the controller, which may be pre-programmed at the chip production level.

In an illustrative, non-limiting embodiment of this invention, the switch assembly has four positions, providing for at least three different light functions and a locking channel. The different positions are defined by the axial position of the rotator relative to the light body. More specifically, each light activating position, or channel, is defined by the position of a magnet, relative to a sensor.

Accordingly, this invention provides a single- or a multi-position switch assembly, which may provide a flashlight having a single- or a multi-position switching mechanism using wireless technology.

This invention separately provides a single- or a multi-position switch assembly, which optionally provides a positive locking feature.

This invention separately provides a single- or a multi-position switch assembly, which provides a multi-position, waterproof, switching mechanism that allows easy battery replacement.

This invention separately provides a single- or a multi-position switch assembly, which is not sealed relative to the outside environment, such that the switch assembly cannot be inadvertently activated in a high-pressure environment such as extreme water depth.

This invention separately provides a single- or a multi-position switch assembly, wherein the switch assembly is isolated from the switched device.

This invention separately provides a single- or a multi-position switch assembly, which provides extended parts life.

These and other features and advantages of this invention are described in or are apparent from the following detailed description of the exemplary embodiments.

BRIEF DESCRIPTION OF THE DRAWINGS

The exemplary embodiments of this invention will be described in detail, with reference to the following figures, wherein like reference numerals refer to like parts throughout the several views, and wherein:

FIG. 2 shows a side cross-sectional view of the first exemplary embodiment of the flashlight comprising a multi-position switch assembly according to this invention;

FIG. 3 shows a side view of the first exemplary embodiment of the flashlight body and head assembly according to this invention;

FIG. 4 shows a cross-sectional view of the first exemplary embodiment of the flashlight body and head assembly of FIG. 3;

DETAILED DESCRIPTION OF EXEMPLARY EMBODIMENTS

Figure 1:
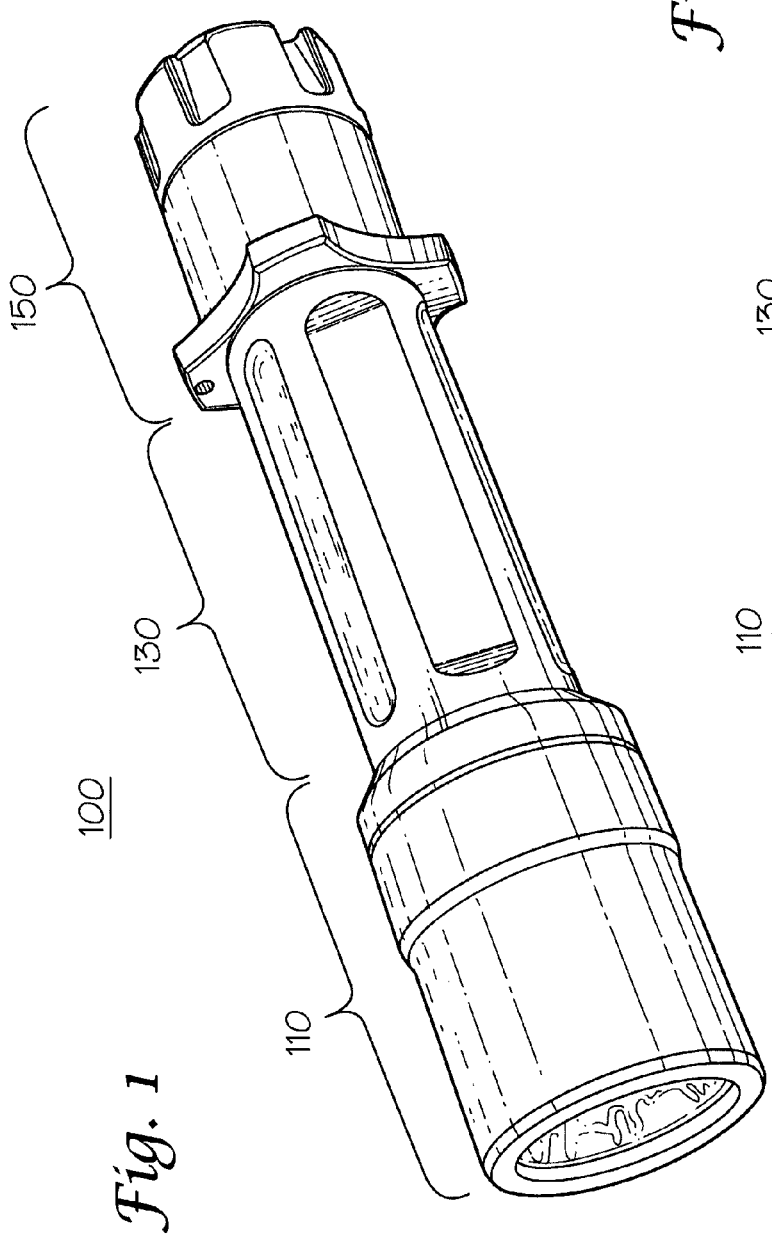
FIG. 1 shows a perspective view of a first exemplary embodiment of a flashlight having a multi-position switch assembly according to this invention.
Figure 1A:
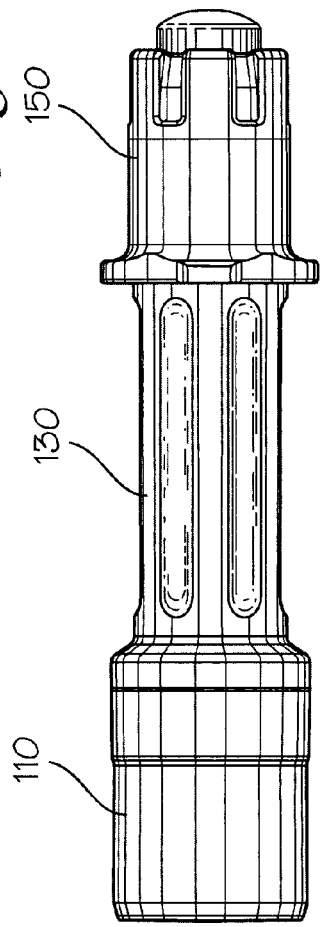
FIG. 1A shows a side view of the first exemplary embodiment of the flashlight, of FIG. 1, having a multi-position switch assembly according to this invention.

For simplicity and clarification, the design factors and operating principles of the flashlight having a multi-position switch assembly according to this invention are explained with reference to various exemplary embodiments of a flashlight having a multi-position switch assembly according to this invention. The basic explanation of the design factors and operating principles of the flashlight having a multi-position switch assembly is applicable for the understanding, design, implementation, and operation of the flashlight having a multi-position switch assembly of this invention.

Furthermore, it should be appreciated that, for simplicity and clarification, the embodiments of this invention will be described with reference to the switch assembly being implemented as a multi-position switching mechanism for a flashlight. However, it should be appreciated that the switch assembly of this invention may be utilized as a multi-position switching mechanism in other applications. Thus, it should be appreciated that the systems, methods, and apparatuses of this invention may be implemented as a multi-position switching mechanism or a single-position switching mechanism for any magnetic-type, contactless switching application, or contact switching application or as part of any other known or later developed switching device.

It should be appreciated that, for simplicity and clarification, the embodiments of this invention will be described with reference to a single- or a multi-position switch assembly's use as the tail cap of a Light Emitting Diode (LED) flashlight.

However, it should be appreciated that the systems, methods, and apparatuses of this invention may be implemented in conjunction with any incandescent, infrared, laser, or other known or later developed visible or non-visible wavelength illumination device.

It should also be appreciated that the term "switch assembly" is for a basic explanation and understanding of the operation of the systems, methods, and apparatuses of this invention. Therefore, the term "switch assembly" is not to be construed as limiting the systems, methods, and apparatuses of this invention.

Turning now to FIGS. 1 through 8, FIGS. 1 through 8 show a variety of views of a first exemplary, non-limiting embodiment of a switch assembly 150 being implemented as a multi-position switching mechanism of a flashlight 100. However, it should be appreciated that the switch assembly 150 of this invention may be implemented as a multi-position switching mechanism for any switching application or as part of any other known or later developed switching device.

As shown in FIGS. 1 through 8, the flashlight 100 comprises at least some of a head assembly 110, a light body assembly 130, and a switch assembly 150. In various exemplary embodiments, the head assembly 110 comprises at least some of a bezel 112, a reflector 114, a light source 116, a lens 118, at least one appropriately sized O-ring 120, a heat sink 122, a spacer 124, a controller 126, and a positive battery contact 128.

Figure 5:
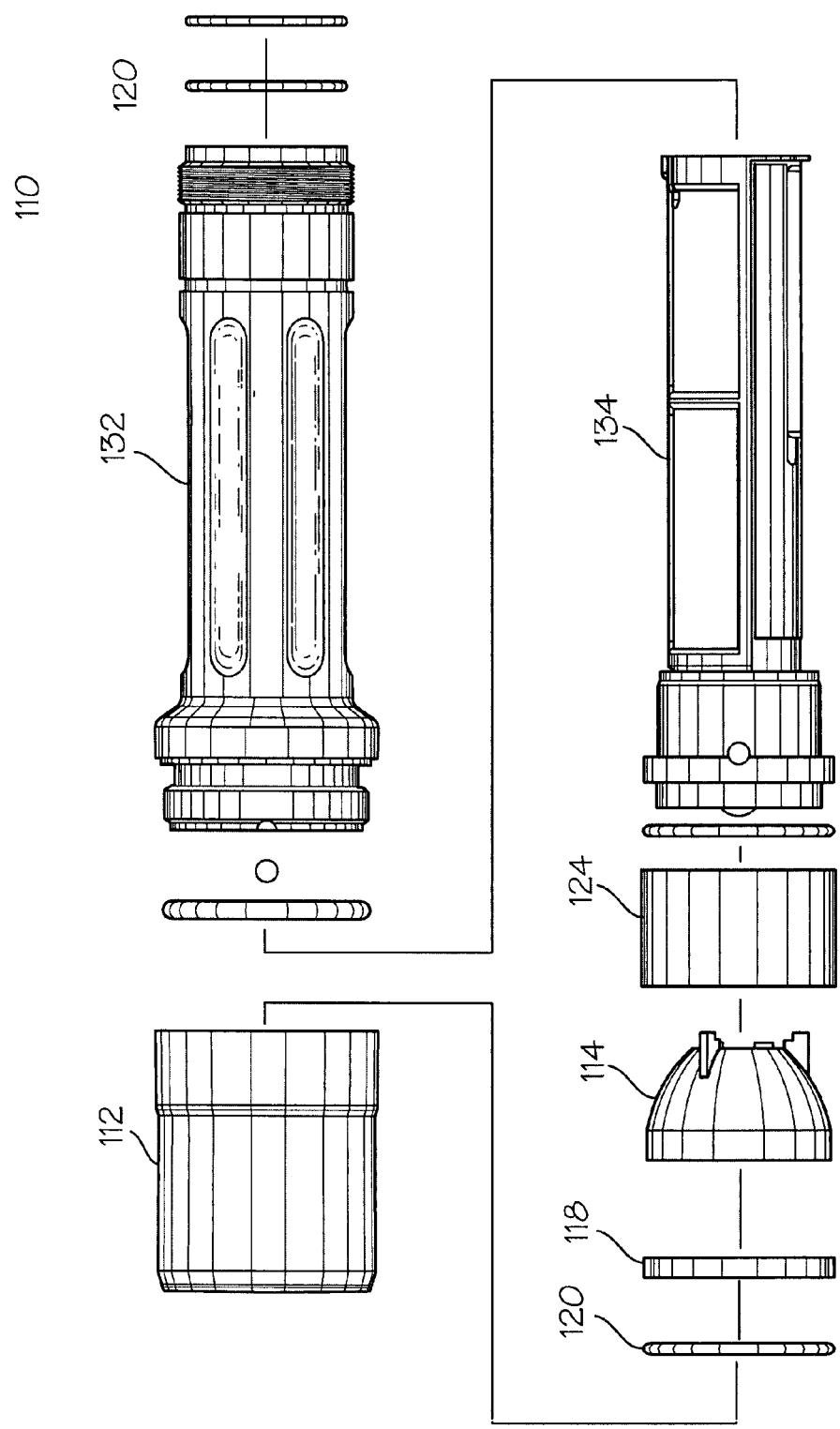
FIG. 5 shows an exploded side view of the first exemplary embodiment of the flashlight body and head assembly of FIGS. 3 and 4.
Figure 6:
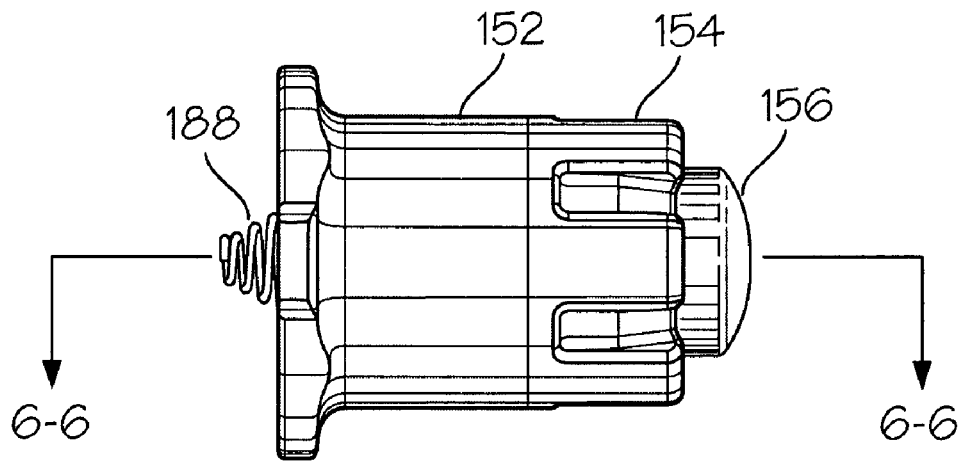
FIG. 6 shows a side view of the first exemplary embodiment of the switch assembly according to this invention.

In various exemplary embodiments, the components of the head assembly 110 are assembled as illustrated in FIGS. 2, 4, and 5. In these exemplary embodiments, the lens 118, the reflector 114, the light source 116, the heat sink 122, the spacer 124, the positive battery contact 128, and the controller 126 are situated within a cavity formed in the bezel 112.

One or more optional, appropriately sized O-rings 120 are included between certain of the components of the head assembly 110. In this manner, a watertight or water resistant seal may be created between the head assembly 110 and the light body assembly 130, when the head assembly 110 is attached or coupled to the light body assembly 130.

Although not illustrated in FIGS. 2, 4, and 5, the positive battery contact 128 is electrically coupled to the light source 116, via the controller 126. Additionally, the positive battery contact 128 is capable of being electrically coupled to a positive terminal of a battery or other voltage source.

In various exemplary embodiments, the controller 126 comprises an integrated circuit that functions as a control switch for the flashlight 100. In this manner, the various output patterns and on/off functions of the light source 116 may be driven and/or controlled by the controller 126. In various exemplary, non-limiting embodiments, the controller 126 comprises a high current MOSFET that functions as a microprocessor-controlled switch. The controller 126 may be pre-programmed at the chip production level.

In various exemplary embodiments, the controller 126 may be programmed and/or reprogrammed based on the specific functions and/or modes desired by the user. Thus, the specific functions, channels, and/or modes of the flashlight 100 may be established and/or altered by the user.

In various exemplary embodiments, the controller 126 may be programmed and/or reprogrammed via a direct or indirect linked connection to a programming and/or reprogramming device. For example, one or more plugs and/or contact points (not shown) may be electrically coupled to the controller 126, such that the controller 126 may be coupled, via one or more corresponding plugs and/or contact points, to a programming and/or reprogramming device.

However, it should be appreciated that the linked connection can be any known or later developed device or system for connecting the controller 126 to a programming and/or reprogramming device, including a direct wired connection, a connection over a cellular telephone network, a very high frequency (VHF) connection, an ultra high frequency (UHF) connection, a radio frequency (RF) connection, a satellite connection, or the like. In general, the linked connection can be any known or later developed connection system or structure usable to connect a programming and/or reprogramming device to the controller 126, including both wired and wireless connections.

The controller 126 may, for example, be programmed to illuminate the light source 116 at a particular light level. The controller 126 may also be programmed to illuminate the light source 116 in an on/off, or strobe, mode. In various exemplary embodiments, the controller 126 may strobe the light source 116 at a rate of greater than 0 to 60 Hz. In other exemplary embodiments, the controller 126 may strobe the light source 116 at a rate of greater than 0 to 30 Hz. In still other exemplary embodiments, the controller 126 may strobe the light source 116 at a rate of about 8 to 20 Hz.

The particular strobe rate may be preprogrammed and fixed or may be adjustable. In various exemplary embodiments, a particular strobe rate may be chosen based on a desired effect of the strobed light on an individual. For example, a strobing rate may be chosen, which effectively masks tactical movement but is not in a realm that can trigger adverse effects in an individual.

The controller 126 may be programmed to illuminate the light source 116 in a signaling mode. In the signaling mode, the controller controls the light source 116 to the emit either visible or non-visible light in a predetermined on/off pattern. In various exemplary embodiments, the signaling pattern may be a standard, preprogrammed pattern, such as, for example, a Morse code pattern. Alternatively, the signaling pattern may be a specific, user-defined pattern.

Visible light and/or non-visible light may be used to provide a signaling pattern. For example, a visible light signaling pattern may be used in a non-covert emergency situation to facilitate the location and/or identification of an individual. Alternatively, a non-visible light signaling pattern may be used to facilitate the location and/or identification of an individual in need of rescue in a covert situation.

It should be appreciated that light signaling patterns may comprise visible light patterns, non-visible light patterns, or a combination of visible and non-visible light patterns.

In various exemplary embodiments, the light source 116 comprises a LED. Alternatively, the light source 116 may comprise an incandescent, infrared, laser, or other known or later developed visible or non-visible wavelength illumination device. In various other exemplary embodiments, the light source 116 may comprise a combination of one or more LEDs, incandescent, infrared, laser, or other known or later developed visible or non-visible wavelength illumination devices.

Although not illustrated in FIGS. 2, 4, and 5, additional materials, such as, for example, gaskets or additional O-rings, may be included between various components of the head assembly 110 to provide a level of shock isolation to the components of the head assembly 110.

The light body assembly 130 comprises at least some of a light body 132, a battery housing 134, and a battery compartment 136. In various exemplary embodiments, the components of the light body assembly 130 are assembled as illustrated in FIGS. 2, 4, and 5.

In various exemplary embodiments, at least a portion of the light body 132 has a 1 inch outer diameter. This allows the flashlight 100 to be mounted on a variety of devices using known ring mounts. At least a portion of the light body 132 may include a groove or flat portion that provides an anti-rotation feature to the flashlight 100 when held within a ring mount.

As illustrated in FIGS. 2, 4, and 5, the battery housing 134 is positioned within a cavity formed by the light body 132. An interior cavity of the battery housing 134 forms the battery compartment 136. The battery housing 134 and a battery compartment 136 are formed so as to allow one or more batteries to be housed within the battery compartment 136.

When positioned within a cavity of the light body 132, the battery housing 134 provides electrical isolation of the batteries from the light body 132. In various exemplary embodiments, the battery housing 134 provides a measure of shock isolation to the batteries.

In various exemplary embodiments, the battery housing 134 includes one or more recessed channels formed in the outer surface of the battery housing 134. Thus, when the battery housing 134 is positioned within a cavity of the light body 132, a flexible circuit may be disposed between the battery housing 134 and the light body 132.

In various exemplary embodiments, the head assembly 110 is permanently attached or coupled to the light body assembly 130. Alternatively, the head assembly 110 may be removably attached or coupled to the light body assembly 130. One or more optional, appropriately sized O-rings 120 may be included between the head assembly 110 and the light body assembly 130.

In various exemplary embodiments, at least a portion of the bezel 112 has a 1¼ inch outer diameter. Thus, a wide variety of known external light filtering and/or shuttering devices may be coupled to the bezel 112. The bezel 112 may include a scalloped surface or end portion.

In various exemplary, non-limiting embodiments, Hall Effect sensors 184 are positioned about the battery housing 134. The Hall Effect sensors 184 are coupled to the battery housing 134 such that the Hall Effect sensors 184 are capable of detecting a relative position of the magnet 174, which is coupled to the actuator 172.

As described herein, three Hall Effect sensors 184 are positioned at three discrete locations around the battery housing 134. The position of each of the Hall Effect sensors 184 corresponds to one of the three light activating positions, or channels, of the rotator 154. Thus, each light activating channel is defined by the position of the magnet 174, which is coupled to the actuator 172, relative to the Hall Effect sensors 184, which are optionally coupled to the battery housing 134.

It should be understood that while the switch assembly 150 is described as having four positions, providing for three light activating channels and a locking channel, the number of light activating channels of the switch assembly 150 is a design choice based on the desired functionality of the flashlight 100. Thus, the switch assembly 150 may be provided with more or less than three light activating channels and may or may not include a locking channel. Furthermore, it should be understood that a separate Hall Effect sensor 184 is included for each light activating channel of a switch assembly.

It should be appreciated that in various alternative exemplary embodiments, the Hall Effect sensors 184 may be coupled to an appropriate portion of the light body 132.

Although not shown, it should be appreciated that the Hall Effect sensors 184 are electrically coupled to the controller 126, such that signals from the Hall Effect sensors 184 may be received by the controller 126. In various exemplary embodiments, a flexible circuit, which is included between the battery housing 134 and the light body 132, is used to electrically couple the Hall Effect sensors 184 to the controller 126.

In various exemplary, non-limiting embodiments, the controller 126 is included between the battery housing 134 and the light body 132.

The switch assembly 150, or tail cap, comprises at least some of a threaded collar 152, a rotator 154, a button 156, a button return spring 158, a cross pin 160, a bearing sleeve 162, bearings 164, spacers 166, rollers 168, an axle pin 170, an actuator 172, a magnet 174, a detent ring 176, an alignment means 178, an O-ring 180, an O-ring 182, a Hall Effect sensors 184, a switch cup 186, and a conical negative battery contact spring 188.

Figure 7:
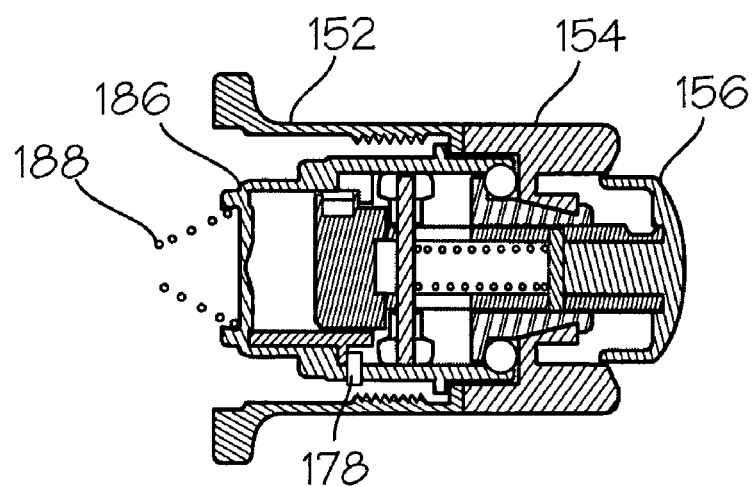
FIG. 7 shows a cross-sectional view of the first exemplary embodiment of the switch assembly of FIG. 6.
Figure 8:
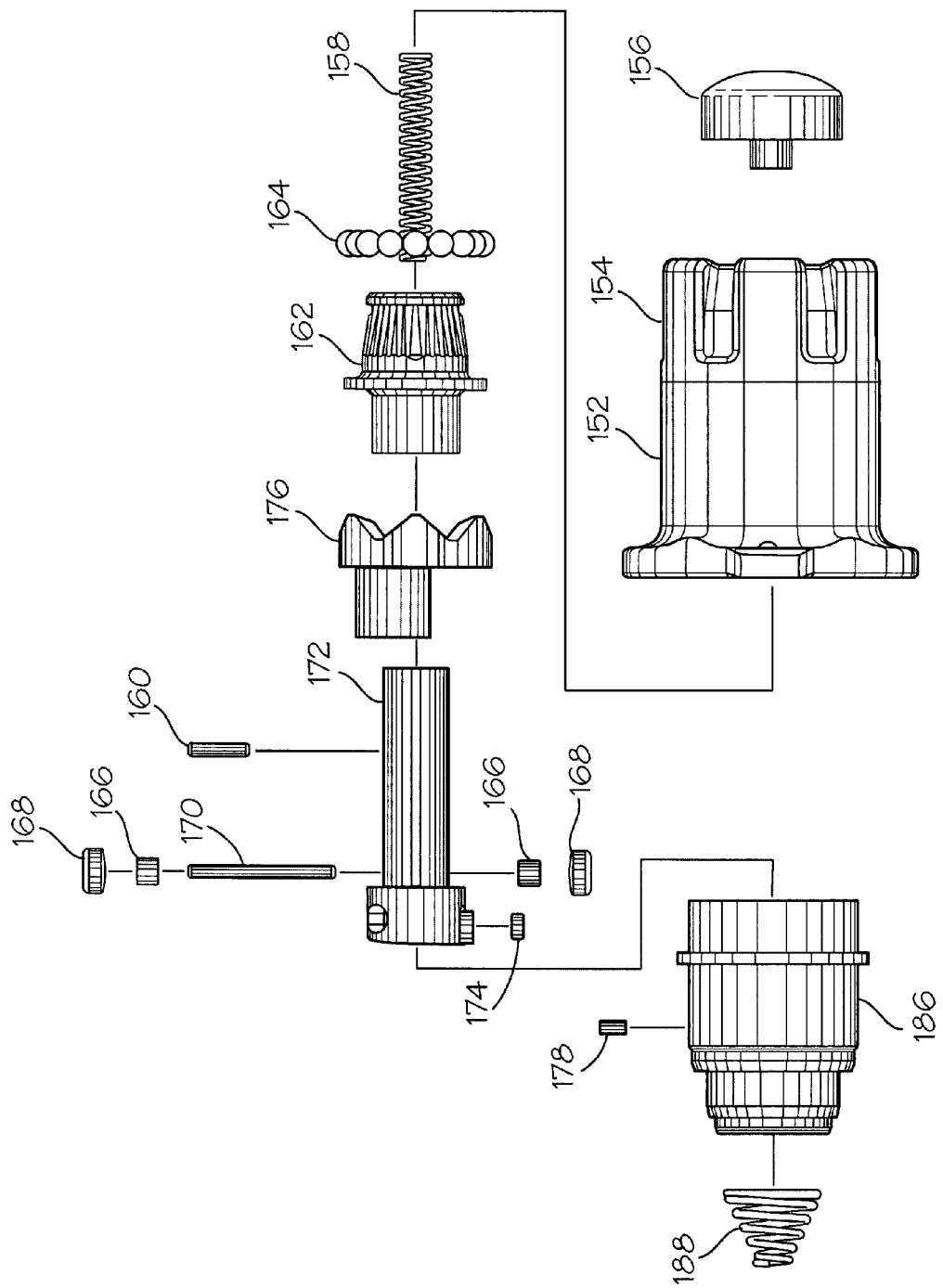
FIG. 8 shows an exploded side view of the first exemplary embodiment of the switch assembly of FIGS. 6 and 7.

As shown in FIGS. 2, 7, and 8, in an illustrative, non-limiting embodiment of this invention, the switch assembly 150 has four positions, providing for three light activating channels and a locking channel. It should be appreciated that the number of positions and the function of each position of the switch assembly 150 is a design choice based on the desired functionality of the flashlight 100. Thus, the switch assembly 150 may be provided with more or less than four positions.

Each position of the switch assembly 150 is defined by the position of the rotator 154/actuator 172 pair relative to the light body 132. More specifically, each light activating channel is defined by the position of the magnet 174, relative to the Hall Effect sensors 184.

As shown in greater detail in FIGS. 2, 7, and 8, the actuator 172 is indexed to the bearing sleeve 162 and the button 156, via a generally hex shaped outer connector portion of the actuator 172 and a corresponding, generally hex shaped inner receiving portion of the bearing sleeve 162 and generally hex shaped outer connector portion of the button 156. In various exemplary embodiments, the actuator 172 is free to slide through the bearing sleeve 162 along a long axis of assembly.

The button return spring 158 is positioned within a pocket formed in the center of an upper portion of the actuator 172 so as to provide a measure of return force to the button 156 when the button 156 is depressed.

Axle pin 170 is positioned within a groove formed along the long axis the actuator 172. Spacers 166 and rollers 168 assist in maintaining the axle pin 170 within the switch cup 186.

The detent ring 176 is rotatably positioned around the outer connector portion of the actuator 172. The rotational travel of the detent ring 176 relative to the actuator 172 is limited by the cross pin 160.

An outer connecting portion of the bearing sleeve 162 is formed so as to be received and maintained within a corresponding inner receiving portion of the rotator 154. Bearings 164 are secured between the bearing sleeve 162 and the rotator 154. In this manner, as the rotator 154 is rotated, the bearing sleeve 162 and the actuator 172 are also rotated.

In various exemplary embodiments, the bearings 164 comprise individual ball or roller bearings secured between the bearing sleeve 162, the rotator 154, and the tail cup 186. In other exemplary embodiments, the bearings 164 comprise individual ball or roller bearings secured as a unit by a cage or retainer (not shown). If the bearings 164 are secured by a cage or retainer, the balls are separated by an even and consistent spacing and may be more accurately guided between the bearing sleeve 162, the rotator 154, and the tail cup 186 during rotation.

In still other exemplary embodiments, the bearings 164 are replaced by corresponding opposing protrusions and detents in mating surfaces of the bearing sleeve 162 and the rotator 154. Thus, when assembled, the mating surfaces of the bearing sleeve 162 and the rotator 154 are nested together.

The magnet 174 is coupled to a lower portion of the actuator 172 such that the magnet 174 is maintained in a fixed position relative to the actuator 172. In various exemplary embodiments, the magnet 174 is a cylindrical magnet.

The switch cup 186 is attached to the rotator 154 via a flexible snap retention detail on the rotator 154. The threaded collar 152 is positioned and maintained between the switch cup 186 and the rotator 154 such that when the switch cup 186 is attached to the rotator 154 the threaded collar 152 is free spinning relative to the switch cup 186 and the rotator 154.

In various exemplary embodiments, the threaded collar 152 includes a plurality of lugs that extend substantially radially from the threaded collar 152. The lugs assist in the assembly and disassembly of the flashlight 100 and provide an anti-roll featured to the flashlight 100. The lugs may be contoured so as to assist in certain specialized grip techniques when employed with a firearm or be used as a defensive tool or a tool in personal control techniques. Additionally, the lugs may include one or more holes or other attachment means such that a lanyard or other device may be attached to the threaded collar 152, via one or more lugs. It should be understood that while the threaded collar 152 is shown as having four lugs, the number and shape of the lugs is a design choice based on the desired functionality of the lugs.

The switch cup 186 and the light body 132 include cooperating alignment means 178. The alignment means 178 operate such that, when the switch assembly 150 is coupled to the light body 132, the switch cup 186 is properly indexed to the light body 132. In various exemplary embodiments, the alignment means 178 comprise an anti-rotation pin extending from either the interior of the light body 132 or the exterior of the switch cup 186 and positioned so as to engage a corresponding alignment groove formed in either the exterior of the switch cup 186 or the interior of the light body 132, respectively.

In various exemplary embodiments, the alignment means 178 comprise an notch formed in either the light body 132 or the switch assembly 150 and positioned so as to engage a corresponding mating block formed in either the switch assembly 150 or the light body 132, respectively.

An inner threaded portion of the threaded collar 152 corresponds to an outer threaded portion of the light body 132. Thus, the switch assembly 150 may be removably attached to the light body 130. In various exemplary embodiments, an O-ring 180 is included in an appropriately sized groove in the outer surface of the light body 132 to provide a watertight or water resistant seal between the outer surface of the light body 132 and an inner surface of the threaded collar 152. In various exemplary embodiments, an O-ring 182 is included in an appropriately sized groove in the inner surface of the light body 132 to provide a watertight or water resistant seal between the inner surface of the light body 132 and an outer surface of the switch cup 186.

The conical negative battery contact spring 188 is electrically coupled to the switch cup 186 such that a negative terminal of a battery or other voltage source may be electrically coupled to the switch cup 186. When the switch assembly 150 is attached to the light body 130, the switch cup 186 is electrically coupled to the light body 132 and, the controller 126.

In various exemplary, non-limiting embodiments, at least some of the head 110, the body 132, and the threaded collar 152 may be formed of aluminum; the button 156, the rotator 154, the switch actuator 172, and the battery housing 134 may be formed of a plastic, such as, for example, a thermoplastic or a polypropylene plastic; and the bearings 164, the button return spring 158, and the negative battery contact spring 188 may be formed of stainless steel.

However, it should be understood that this listing of exemplary materials is not to be construed as limiting the materials that are used to form the various components of the flashlight 100. Alternate materials of construction may include one or more of the following: steel, aluminum, titanium, and/or other ferros or non-ferros metals, as well as various alloys and composites thereof, glass-hardened polymers, polymer or fiber reinforced metals, carbon fiber or glass fiber composites, thermoset or thermoplastic resins, chopped glass or carbon fibers used for injection molding compounds, laminate glass or carbon fiber, epoxy laminates, woven glass fiber laminates, impregnate fibers, polyester resins, epoxy resins, phenolic resins, polyimide resins, cyanate resins, high-strength plastics, polymers, polymeric composites, thermoplastics, polypropylene, nylon, glass, or polymer fiber reinforced plastics, thermoform and/or thermoset sheet materials, and/or various combinations of the foregoing. Thus, it should be understood that the material or materials used to form the various components of the flashlight 100 is a design choice based on the desired appearance and functionality of the various components of the flashlight 100.

During use of the flashlight 100, when the button 156 is depressed, the actuator 172 is moved from a spring biased, or first position within the switch cup 186 (as shown in FIG. 2) to a depressed, or second position within the switch cup 186. When the actuator 172 is moved from the first position to the second position, the magnet 174 is moved to a position that is proximate one of the Hall Effect sensors 184.

When the magnet 174 is moved to a position that is proximate one of the Hall Effect sensors 184, the magnetic field from the magnet 174 activates the proximate Hall Effect sensor 184. When the Hall Effect sensor 184 is activated, a signal is sent to the controller 126.

When the controller 126 receives a signal that a Hall Effect sensor 184 has been activated, the controller 126 determines the output function for the light source 116 that is represented by the activated Hall Effect sensor 184 and activates the light source 116 appropriately.

When the rotator 154 is rotated to a different position, or channel, the bearing sleeve 162, the actuator 172, and the magnet 174 are also rotated to that relative position. Thus, depending upon the position of the rotator 154 when the button 156 is depressed, the magnet 174 will activate a different Hall Effect sensor 184, signaling the controller 126 to activate the light source 116 according to the output function for the light source 116 that is represented by the instant position of the rotator 154.

In various exemplary embodiments, wherein the switch assembly 150 includes a locking position, or channel, a projection on the detent ring 176 engages the axle pin 170 such that the button 156 cannot be depressed. This blocking feature prevents the actuator 172 from moving to the second position and provides a positive locking for the switch assembly 150.

Alternatively, the features of the locking channel may be accomplished by positioning the locking position, or channel, at a location that does not include a corresponding Hall Effect sensor 184. In this manner, when the rotator 154 is in the locking channel and the button 156 is depressed, the actuator 172 moves to the second position, but does not activate a Hall Effect sensor 184. Thus, while the button 156 may be depressed in this exemplary embodiment of the locking channel, the status quo of the light source 116 is maintained.

The rotator 154/actuator 172 does not seal the interior of the switch cup 186 relative to the outside environment. Thus, the interior of the switch cup 186 is not sealed relative to the outside environment. This allows the interior of the switch cup 186 to be at the same pressure as the outside of the switch assembly 150 and/or the flashlight 100. This prevents the button 156 from being depressed and the light source 116 from being inadvertently activated in a high-pressure environment such as extreme water depth.

In an illustrative, non-limiting embodiment of this invention, the switch assembly 150 has three light activating positions, or channels, for three different light emitting functions. As discussed above, each light activating channel is defined by the axial position of the rotator 154 relative to the light body 132. More specifically, each light activating channel is defined by the position of the magnet 174, which is coupled to the actuator 172, relative to the Hall Effect sensors 184.

In one exemplary embodiment, the three light emitting functions include a strobe mode, a constant on and adjustable mode, and a momentary maximum power on mode. These functions, or modes, are represented by three light activating positions, or channels, of the switch assembly 150. Beginning at the most clockwise channel of the rotator 154, as viewed from the button 156 end of the flashlight 100, the channels are: channel "one" momentary maximum power on mode; channel "two" strobe mode; channel "three" constant on and adjustable, or multi-dimming, mode. Optionally, the switch assembly 150 may include a channel "four", which is a power locking channel.

According to the convention of this exemplary, non-limiting embodiment, when the rotator 154 is in channel "one" (turned fully clockwise, as viewed from the button 156 end of the light), momentary on mode, the light source 116 is illuminated only when the button 156 is depressed fully. When the button 156 is released, the light source 116 is turned off.

When the rotator 154 is in channel "two", strobe mode, and the button 156 is depressed, the light source 116 is controlled to illuminate or strobe on and off at a rate of about 8-20 Hz. With the rotator 154 is in channel "two", when the button 156 is depressed fully, the strobe mode is activated. Releasing the button 156 deactivates the strobe mode.

When the rotator 154 is in channel "three", constant on and adjustable, the light source 116 can be illuminated at maximum power or adjusted to a lower power setting, allowing use of the light at less than full brightness. With the rotator 154 is in channel "two", when the button 156 is depressed fully and released relatively quickly, the controller 126 controls the light source 116 to be illuminated at a predetermined level. In various exemplary embodiments, the controller may be programmed to control the light source 116 to be illuminated at maximum power (i.e. maximum brightness), at minimum power (i.e. minimum brightness), or at a determined power level between maximum power and minimum power (i.e. a determined brightness). When the button 156 is once again depressed and released relatively quickly, the light source 116 is turned off.

While the rotator 154 is in channel "three", if the button 156 is maintained in a depressed state for a brief period of time, such as, for example, approximately 1 to 3 seconds, the light begins to dim. Over, for example, approximately 5 seconds, the light will dim from maximum brightness to minimum brightness. If the button 156 is released at any point during the dimming cycle, the light output from the light source 116 will remain at the brightness/power output level the light source 116 was at when the button 156 was released.

If the button 156 is once again maintained in a depressed state for a brief period of time, the light begins to brighten from the brightness level the light source 116 was at when the button 156 was initially released. Over a period of time, the light will brighten to maximum brightness. If the button 156 is released at any point during the brightening cycle, the light output from the light source 116 will remain at the brightness/power output level the light source 116 was at when the button 156 was released.

Thus, while the rotator 154 is in channel "three", so long as the button 156 is maintained in a depressed state for a brief period of time and them released, the brightness level of the light source 116 will continue to cycle from a maximum brightness to a minimum brightness, or vice versa. When the button 156 is depressed and released relatively quickly, the light source 116 is turned off.

When the rotator 154 is in channel "four" the switch assembly 150 is in the locking channel. The purpose of the locking channel is to prevent the light from being illuminated or extinguished unintentionally. Turning the rotator 154 to the locking channel is achieved by partially depressing the button 156 (approximately ⅓ of the full travel), while the light is in channel "three", and turning the rotator 154 further to the rotation stop in the counter-clockwise direction. In the locking channel, the button 156 remains partially depressed serving as visual indication that the switch assembly 150 is in the locking channel. In this channel, the button 156 is prevented from being depressed by an internal stop.

When the rotator 154 is rotated to the locking channel while the light source 116 is illuminated, the button 156 is prevented from being depressed, and the light source 116 is effectively prevented from being extinguished.

When the rotator 154 is rotated to the locking channel while the light source 116 is off, the button 156 is prevented from being depressed, and the light source 116 is effectively prevented from being activated.

To disengage the locking channel, the rotator 154 is merely rotated clockwise. Once the rotator 154 is rotated out of the locking channel, the rotator 154 may be freely rotated between the remaining channels. In various exemplary embodiments, the rotational force necessary to rotate the rotator 154 out of the locking channel is greater than the rotational force necessary to rotate the rotator 154 between any of the other channels.

In various exemplary embodiments, the rotator 154 can be rotated to any one of the channels while a current function of the flashlight 100 is maintained. For example, if the rotator 154 is in channel "three", and the light source 116 is controlled to illuminate at minimum power, the rotator 154 can be rotated to channel "two", strobe mode, without effecting the current illumination of the light source 116. Once the rotator 154 has been rotated to channel "two", if the button 156 is depressed, the light source 116 will be controlled to illuminate in the strobe mode.

In an illustrative, non-limiting embodiment of this invention, when the light source 116 is on in the maximum power, constant on mode, if the battery voltage is decreased to a point at which the controller 126 is unable to maintain the light source 116 at maximum power output, the controller 126 may optionally control the light source 116 to flash off for a brief period of time (approximately microseconds) and then turn back on at maximum power. This may occur approximately every 10 seconds for a predetermined period of time.

In certain exemplary embodiments, if the predetermined period of time expires and the battery voltage is still at a level at which the controller 126 is unable to maintain the light source 116 at maximum power output (i.e., the batteries have not been replaced), the controller 126 may optionally control the light source 116 to operate at a lower power/brightness mode in an effort to extend the amount of time the light source 116 can remain on.

Alternatively, if the battery voltage is decreased to a point at which the controller 126 is unable to maintain the light source 116 at maximum power output, the controller 126 may both control the light source 116 to flash off for a brief period of time and then turn back on at maximum power, as described above, and control the light source 116 to operate at a lower power/brightness mode, as also described above.

In a second exemplary embodiment of a flashlight having a multi-position switch assembly according to this invention, the magnet 174 is replaced by a first electrical contact (not shown) and the Hall Effect sensors 184 are each replaced by a second electrical contact (not shown).

The first electrical contact is coupled to the actuator 172 and each of the second electrical contacts is coupled to the battery housing 134. In various exemplary embodiments, the first electrical contact travels in a track, or aperture, formed in the switch cup 186. In this manner, first electrical contact is capable of being electrically coupled to one of the second electrical contacts, depending upon the position of the rotator 154/actuator 172 pair relative to the light body 132.

During use of the second exemplary embodiment of the flashlight, when the button 156 is depressed, the actuator 172 is moved from a spring biased, or first position within the switch cup 186 to a depressed, or second position within the switch cup 186. When the actuator 172 is moved from the first position to the second position, the first electrical contact is moved to a position that allows the first electrical contact to be electrically coupled to one of the second electrical contacts.

When the first electrical contact is electrically coupled to one of the second electrical contacts, a signal is sent to the controller 126.

When the controller 126 receives a signal that the first electrical contact is electrically coupled to one of the second electrical contacts, the controller 126 determines the output function for the light source 116 that is represented by the electrically coupled second electrical contact and activates the light source 116 appropriately.

When the rotator 154 is rotated to a different position, or channel, the bearing sleeve 162, the actuator 172, and the first electrical contact are also rotated to that relative position. Thus, depending upon the position of the rotator 154 when the button 156 is depressed, the first electrical contact will be electrically coupled to a different one of the second electrical contacts, signaling the controller 126 to activate the light source 116 according to the output function for the light source 116 that is represented by the instant position of the rotator 154.

In still other exemplary embodiments, the rotator 154 may be maintained in a single position, such that the flashlight of the present invention, whether including a magnetic means, such as the combination of magnet 174 and a Hall Effect sensor, or a physical electrical contact, such as provided by the first electrical contact and the second electrical contact, serves only one on/off or illumination function.

While this invention has been described in conjunction with the exemplary embodiments outlined above, it is evident that this invention is not limited to particular variations set forth and many alternatives, adaptations, modifications, and variations will be apparent to those skilled in the art. Such alternatives, adaptations, modifications, and variations should and are intended to be comprehended within the meaning and range of equivalents of the disclosed exemplary embodiments and may be substituted without departing from the true spirit and scope of the invention.

Furthermore, where a range of values is provided, it is understood that every intervening value, between the upper and lower limit of that range and any other stated or intervening value in that stated range is encompassed within the invention. The upper and lower limits of these smaller ranges may independently be included in the smaller ranges and is also encompassed within the invention, subject to any specifically excluded limit in the stated range. Where the stated range includes one or both of the limits, ranges excluding either both of those included limits are also included in the invention.

It is to be understood that the phraseology of terminology employed herein is for the purpose of description and not of limitation. Unless defined otherwise, all technical and scientific terms used herein have the same meaning as commonly understood by one of ordinary skill in the art to which this invention belongs.

Also, it is contemplated that any optional feature of the inventive variations described herein may be set forth and claimed independently, or in combination with any one or more of the features described herein.

Accordingly, the foregoing description of the exemplary embodiments of the invention, as set forth above, are intended to be illustrative, not limiting. Various changes, modifications, and/or adaptations may be made without departing from the spirit and scope of this invention.

What is claimed is:

1. A lighting device having a multi-channel switch assembly, comprising:
   a head assembly, wherein the head assembly comprises a light source;
   a light body having a first end and a second end, wherein the head assembly is coupled to the first end of the light body;
   a battery housing, wherein an interior cavity of the battery housing defines a battery compartment capable of receiving a battery, and wherein the battery housing is positioned within a cavity formed by the light body;
   a switch assembly coupled to the second end of the light body via a threaded collar, wherein the switch assembly comprises at least some of a rotator that is rotatable to at least two light activating channels relative to the light body;
   an actuator, wherein the actuator includes a first electrical contact coupled to a lower portion of the actuator such that the first electrical contact is maintained in a fixed position relative to the actuator, wherein the first electrical contact comprises a magnetic contact, and wherein the actuator is coupled to the rotator such that when the rotator is rotated to a light activating channel, the actuator and the first electrical contact are also rotated to a corresponding light activating channel;
   a switch cup rotatably coupled to the rotator and the threaded collar, wherein when the switch assembly is coupled to the light body, the switch cup is indexed to the light body, and wherein the switch cup is electrically coupled to the battery such that, when the switch assembly is coupled to the light body, the switch cup is electrically coupled to the light body and the controller;
   at least one second electrical contact associated with each light activating channel of the switch assembly, wherein the at least one second electrical contact comprises a hall effect contact, wherein the at least one second electrical contact is coupled to the battery housing, and wherein each second electrical contact is capable of producing an activation signal when the first electrical contact makes electrical contact with the second electrical contact;
   wherein, when the actuator is moved from a first position within the switch cup to a second position within the switch cup, such that the first electrical contact is moved to a position wherein the first electrical contact makes electrical contact with the second electrical contact associated with an instant light activating channel of the rotator such that the electrical contact of the first electrical contact activates the proximate second electrical contact associated with an instant light activating channel of the rotator; and a controller, wherein the controller is electrically coupled to each second electrical contact such that the controller is capable of receiving an activation signal from each second electrical contact and determining the output function for the light source that is represented by the activated second electrical contact, wherein the controller is electrically coupled to the light source and the battery such that the controller is capable of energizing the light source in response to the receipt of an activation signal from each second electrical contact and controlling the output patterns and on/off functions of the light source.

2. The lighting device of claim 1, wherein the light source comprises at least one Light Emitting Diode that is capable of emitting visible or non-visible coherent laser light, or visible or non-visible non-coherent wavelength light.

3. The lighting device of claim 1, wherein the light source comprises at least one incandescent illumination device that is capable of emitting visible or non-visible coherent laser light, or visible or non-visible non-coherent wavelength light.

4. The lighting device of claim 1, wherein the light source comprises at least one Light Emitting Diode and at least one incandescent illumination device, wherein the at least one Light Emitting Diode and the at least one incandescent illumination device are capable of emitting visible or non-visible coherent laser light, and/or visible or non-visible non-coherent wavelength light.

5. The lighting device of claim 1, wherein the controller is disposed between the battery housing and the light body.

6. The lighting device of claim 1, wherein the controller comprises an integrated circuit.

7. The lighting device of claim 1, wherein the controller comprises a high current MOSFET.

8. The lighting device of claim 1, wherein the controller is capable of being reprogrammed via a direct linked connection to a reprogramming device.

9. The lighting device of claim 1, wherein the controller is capable of being reprogrammed via an indirect connection to a reprogramming device.

10. The lighting device of claim 1, wherein the head assembly is permanently attached to the light body assembly.

11. The lighting device of claim 1, wherein the battery housing is permanently attached within the cavity formed by the light body.

12. The lighting device of claim 1, wherein an actuator return spring is positioned so as to provide a measure of return force to the actuator.

13. The lighting device of claim 1, wherein the switch assembly includes a locking channel, wherein the locking channel prevents the actuator from moving to the second position.

14. The lighting device of claim 1, wherein the interior of the switch cup is not sealed relative to the outside environment, such that the interior of the switch cup is maintained at a same pressure as an outside of the switch assembly.

15. The lighting device of claim 1, wherein the light activating channels include a strobe mode channel.

16. The lighting device of claim 15, wherein, in the strobe mode, the light source is controlled to strobe on and off at a rate of greater than 0 to 60 Hz when the actuator is moved to the second position.

17. The lighting device of claim 15, wherein, in the strobe mode, the light source is controlled to strobe on and off at a rate of greater than 0 to 30 Hz when the actuator is moved to the second position.

18. The lighting device of claim 15, wherein, in the strobe mode, the light source is controlled to strobe on and off at a rate of about 8 to 20 Hz when the actuator is moved to the second position.

19. The lighting device of claim 1, wherein the light activating channels include a constant on and adjustable mode channel.

20. The lighting device of claim 19, wherein in the constant on and adjustable mode the light source illuminated at a predetermined light level when the actuator is moved to the second position and released relatively quickly and wherein the light source is turned off when the actuator is again moved to the second position and released relatively quickly.

21. The lighting device of claim 19, wherein in the constant on and adjustable mode the light source is controlled by the controller to illuminated at a predetermined light level and then initiate a dimming and brightening cycle when the actuator is moved to the second position and maintained in the second position for a determined period of time, and wherein if the actuator is released at any point during the dimming and brightening cycle, the light source is controlled to remain at the brightness level the light source was at when the actuator was released.

22. The lighting device of claim 19, wherein in the constant on and adjustable mode the light source is controlled by the controller to initiate a dimming and brightening cycle beginning from the brightness level the light source was at when the actuator was released when the actuator is once again maintained in the second position for a determined period of time.

23. The lighting device of claim 19, wherein in the constant on and adjustable mode, when the actuator is moved to the second position and released relatively quickly, the light source is controlled by the controller to turn off.

24. The lighting device of claim 1, wherein the light activating channels include a momentary maximum power on mode channel.

25. The lighting device of claim 1, wherein the light activating channels include a signaling mode channel.

26. The lighting device of claim 25, wherein in the signaling mode a visible light source is controlled to illuminate at a preprogrammed pattern or a user programmable pattern when activated.

27. The lighting device of claim 25, wherein in the signaling mode a non-visible light source is controlled to illuminate at a preprogrammed pattern or a user programmable pattern when activated.

28. A lighting device having a multi-channel switch assembly, comprising:
    a head assembly, wherein the head assembly comprises a light source;
    a light body having a first end and a second end, wherein the head assembly is coupled to the first end of the light body;
    a battery compartment formed within a cavity of the light body, wherein the battery compartment capable of receiving a battery;
    a switch assembly coupled to the light body;
    an actuator, wherein the actuator includes a first electrical contact coupled to a lower portion of the actuator such that the first electrical contact is maintained in a fixed position relative to the actuator;

a switch cup coupled to the light body, wherein the switch cup is electrically coupled to the battery such that, when the switch assembly is coupled to the light body, the switch cup is electrically coupled to the light body and the controller, and wherein the actuator is movably positioned within the switch cup such that the actuator is movable between a first position within the switch cup and a second position within the switch cup;

at least one second electrical contact associated with a light activating channel of the switch assembly, wherein the at least one second electrical contact is capable of producing an activation signal when the first electrical contact makes electrical contact with the second electrical contact;

wherein, when the actuator is moved from a first position within the switch cup to a second position within the switch cup, the first electrical contact is moved to a position wherein the first electrical contact makes electrical contact with the at least one second electrical contact; and a controller, wherein the controller is electrically coupled to the at least one second electrical contact such that the controller is capable of receiving an activation signal from the at least one second electrical contact and determining the output function for the light source that is represented by the at least one activated second electrical contact, wherein the controller is electrically coupled to the light source and the battery such that the controller is capable of energizing the light source in response to the receipt of an activation signal from the at least one second electrical contact and controlling the on/off functions of the light source.

29. The lighting device of claim 28, wherein the light source comprises at least one Light Emitting Diode that is capable of emitting laser, visible, or non-visible wavelength light.

30. The lighting device of claim 28, wherein the battery compartment is capable of receiving a battery housing, wherein an interior cavity of the battery housing is capable of receiving a battery.

31. The lighting device of claim 28, wherein the light source is controlled to strobe on and off at a rate of greater than 0 to 60 Hz when the actuator is moved to the second position.

32. The lighting device of claim 28, wherein the light source is controlled to strobe on and off at a rate of greater than 0 to 30 Hz when the actuator is moved to the second position.

33. The lighting device of claim 28, wherein the light source is controlled to strobe on and off at a rate of about 8 to 20 Hz when the actuator is moved to the second position.

* * * * *